US008806251B2

(12) United States Patent
Yamaguchi (10) Patent No.: US 8,806,251 B2
(45) Date of Patent: *Aug. 12, 2014

(54) IMAGE FORMING APPARATUS OPERATING IN NORMAL OPERATION MODE OR POWER SAVE OPERATION MODE UTILIZING TWO PROCESSORS (71) Applicant: Oki Data Corporation, Tokyo (JP)

(72) Inventor: Tatsumi Yamaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,268

(22) Filed: Dec. 18, 2012

(65) Prior Publication Data
US 2013/0111246 A1 May 2, 2013

Related U.S. Application Data (63) Continuation of application No. 12/816,755, filed on Jun. 16, 2010, now Pat. No. 8,370,664.

(30) Foreign Application Priority Data

Jun. 22, 2009 (JP) ................. 2009-147480

(51) Int. Cl.
*G06F 1/00* (2006.01)
*G06F 1/32* (2006.01)
*G06F 1/04* (2006.01)
*G06F 15/00* (2006.01)
*G06F 11/00* (2006.01)
*G06F 9/46* (2006.01)

(52) U.S. Cl.
USPC ........... 713/323; 713/320; 713/324; 713/375; 712/25; 712/28; 712/32; 714/10; 718/100

(58) Field of Classification Search
USPC ........ 713/320, 323, 324, 375; 712/25, 28, 32; 714/10; 718/100
See application file for complete search history.

(56) References Cited

U.S. PATENT DOCUMENTS

| 6,895,196 B2 | 5/2005 | Uchizono et al. |
| 7,555,662 B2 | 6/2009 | Kidoguchi |
| 7,890,784 B2 | 2/2011 | Katoh |
| 8,082,461 B2 | 12/2011 | Ohhashi |
| 2009/0240966 A1 | 9/2009 | Katoh |

FOREIGN PATENT DOCUMENTS

JP 2001-047693 2/2001

*Primary Examiner* — Stefan Stoynov
(74) *Attorney, Agent, or Firm* — Kubotera & Associates, LLC (57) ABSTRACT

An electric device is capable of operating in a normal operation mode and a power save operation mode. The electric device includes a first processor for processing information input externally in the normal operation mode, and a second processor for processing an internal operation of the electric device in the normal operation mode. The second processor consumes power smaller than that of the first processor. In the electric device, power of the first processor is restricted through a restriction process in the power save operation mode. Further, in the power save operation mode, the second processor restricts the internal operation and processes the information input externally. When the second processor detects the information input externally, power of the first processor is released through a restriction releasing process.

4 Claims, 6 Drawing Sheets

IMAGE FORMING APPARATUS OPERATING IN NORMAL OPERATION MODE OR POWER SAVE OPERATION MODE UTILIZING TWO PROCESSORS

CROSS-REFERENCE TO RELATED APPLICATIONS

This is a continuation application of a prior U.S. application Ser. No. 12/816,755, filed Jun. 16, 2010, allowed and issued as U.S. Pat. No. 8,370,664.

BACKGROUND OF THE INVENTION AND RELATED ART STATEMENT

The present invention relates to an electric device capable of operating in a plurality of operation modes such as a normal operation mode (referred to as a normal mode) and a power save operation mode (referred to as a power save mode).

A conventional electric device (for example, an image forming apparatus such as a printer) may be connected to a network (refer to Patent Reference). In the conventional electric device, an ASIC (Application Specific Integrated Circuit) constitutes a processor for a network processing. Accordingly, even when a main CPU (Central Processing Unit) is turned off, the processor for the network processing is capable of determining whether data are received or transmitted through the network (refer to Patent Reference).

Patent Reference: Japanese Patent Publication No. 2001-47693

In the conventional electric device, when the processor for the network processing determines that data are received for performing a printing operation, an entire portion of the conventional electric device including the main processor is turned on. The processor for the network processing monitors a state of the network all the time, and is never turned off. Further, it is necessary to provide a processor in an engine of the image forming apparatus for an image processing.

In the conventional electric device described above, it is necessary to provide a processor specifically for controlling an external interface as well. Accordingly, including a processor for a mechanical control, it is necessary to provide three processors, thereby increasing power consumption during a normal use.

In view of the problems described above, an object of the present invention is to provide an electric device capable of solving the problems of the conventional electric device.

Further objects and advantages of the invention will be apparent from the following description of the invention.

SUMMARY OF THE INVENTION

In order to attain the objects described above, according to the present invention, an electric device is capable of operating in a normal operation mode (referred to as a normal mode) and a power save operation mode (referred to as a power save mode). The electric device includes a first processor for processing information input externally in the normal operation mode, and a second processor for processing an internal operation of the electric device in the normal operation mode. The second processor consumes power smaller than that of the first processor.

In the electric device, power of the first processor is restricted through a restriction process in the power save operation mode. Further, in the power save operation mode, the second processor restricts the internal operation and processes the information input externally. When the second processor detects the information input externally, power of the first processor is released through a restriction releasing process.

In the present invention, the second processor is provided for processing the internal operation of the electric device in the normal operation mode, and the second processor consumes power smaller than that of the first processor. In the power save operation mode, the second processor processes the information input externally. Through the restriction process, power of the first processor with larger power consumption or an unnecessary circuit portion is restricted or terminated. Accordingly, it is possible to reduce power consumption during an idle state of the electric device. Further, it is possible to continue to process the information input externally, thereby improving operability of the electric device.

DETAILED DESCRIPTION OF PREFERRED EMBODIMENTS

Hereunder, embodiments of the present invention will be explained with reference to the accompanying drawings. Note that the accompanying drawings are shown only for an explanation purpose, and the present invention is not limited to the accompanying drawings.

First Embodiment

Figure 1:
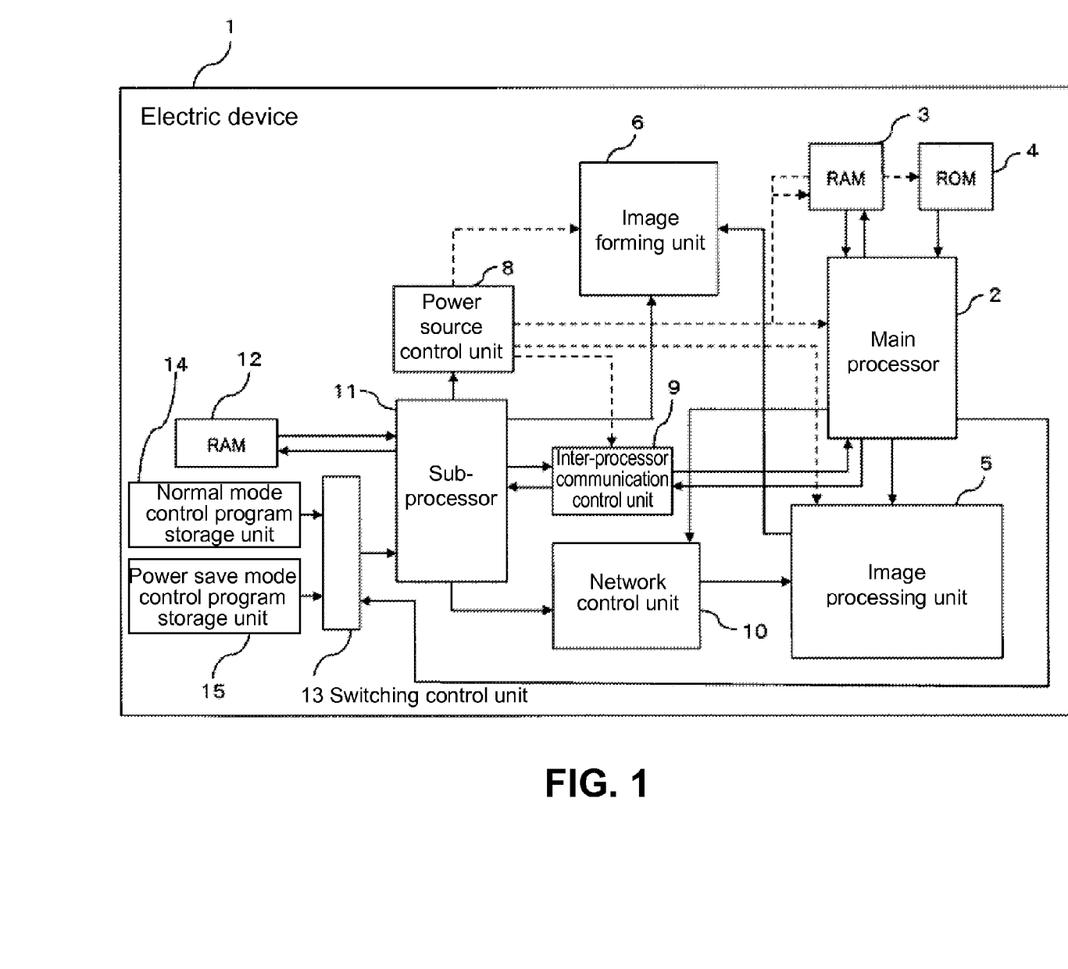
FIG. 1 is a schematic view showing a block diagram showing a configuration of an electric device according to a first embodiment of the present invention.

A first embodiment of the present invention will be explained. FIG. 1 is a schematic view showing a block diagram showing a configuration of an electric device 1 according to the first embodiment of the present invention.

In the embodiment, the electric device 1 is an image forming apparatus (for example, an electro-graphic type page printer) having a power save mode.

As shown in FIG. 1, the electric device 1 includes a first processor 2 (for example, a main processor). The main processor 2 is formed of a CPU (Central Processing Unit) for performing an interface control with respect to an external control device (for example, a host personal computer or a host PC) connected to the electric device 1 through a network (not shown), and for processing image data.

As shown in FIG. 1, the main processor 2 is connected to an RAM 3 (Random Access Memory), an ROM 4 (Read Only Memory), and an image processing unit 5. In the embodiment, the RAM 3 is an operational memory for the main processor 2 to process data, and the main processor 2 accesses to the RAM 3. The ROM 4 is a memory for storing an instruction of the main processor 2, and the main processor 2 accesses to the ROM 4.

In the embodiment, the main processor 2 controls the image processing unit 5. In particular, the image processing unit 5 is formed of a circuit for performing a specific process on print data and the like received under control of the main processor 2, so that the print data are converted to a printable format. Further, the image processing unit 5 is connected to an image forming unit 6. The image forming unit 6 is formed of a mechanical unit including a motor and the like for forming an image on a recording medium (for example, a sheet) according to the printable data and an image forming processing unit for creating the image from an electrical signal.

In the embodiment, the electric device 1 further includes a power source control unit 8. In addition to a function of supplying power, the power source control unit 8 is capable of independently supplying and terminating power to the main processor 2, the RAM 3, the ROM 4, the image processing unit 5, the image forming unit 6, and an inter-processor communication control unit 9 connected to the power source control unit 8 (represented within a hidden line). The inter-processor communication control unit 9 is connected between the main processor 2 and a second processor 11 (for example, a sub-processor 11), and the sub-processor 11 is connected to the image processing unit 5 through a network control unit 10.

In the embodiment, the inter-processor communication control unit 9 is formed of a circuit for controlling transmission and reception of a command and data between the main processor 2 and the sub-processor 11. The network control unit 10 is formed of a circuit for controlling network connection with respect to the host PC (not shown).

In the normal mode, the main processor 2 controls the network control unit 10. In the power save mode, the sub-processor 11 controls the network control unit 10. The sub-processor 11 is formed of a CPU (Central Processing Unit) having power consumption smaller than that of the main processor 2. In the normal mode, the sub-processor 11 controls the image forming unit 6 (performs mechanical control of the electric device 1). In the power save mode, the sub-processor 11 controls the network control unit 10.

In the embodiment, the sub-processor 11 is connected to an RAM 12 and a switching control unit 13. The switching control unit 13 is connected to a normal mode control program storage unit 14 and a power save mode control program storage unit 15. The RAM 12 is an operational memory, and the sub-processor 11 accesses to the RAM 12.

In the embodiment, the switching control unit 13 is formed of a circuit for switching a command retrieved from the normal mode control program storage unit 14 or the power save mode control program storage unit 15 formed of an ROM for storing a command of the sub-processor 11. In particular, the switching control unit 13 has a function of performing a switching operation according to an instruction of the main processor 2. Further, the normal mode control program storage unit 14 is a memory for storing a control command of the sub-processor 11 in the normal mode, and the power save mode control program storage unit 15 is a memory for storing a control command of the sub-processor 11 in the power save mode.

An entire operation of the electric device 1 shown in FIG. 1 will be explained next. In the normal mode, the electric device 1 is connected to the host PC through the network. When the main processor 2 controls the network control unit 10 and receives the print data from the host PC through the network, the main processor 2 controls the image processing unit 5 to process the print data according to contents of the print data.

When the image processing unit 5 creates the printable data (bit map data), the printable data are transmitted to the image forming unit 6. The main processor 2 notifies the image forming unit 6 that the printable data are created through the inter-processor communication control unit 9. According to the instruction of the main processor 2, the sub-processor 11 controls the image forming unit 6 to perform a printing operation on the recording sheet.

In the embodiment, when the electric device 1 does not receive the print data for a specific period of time, the main processor 2 starts a transition process for switching from the normal mode to the power save mode. More specifically, the main processor 2 sends an instruction to the sub-processor 11 to switch to the power save mode through the inter-processor communication control unit 9. When the sub-processor 11 receives the instruction, the sub-processor 11 performs a process for turning off power of the image forming unit 6. After the sub-processor 11 completes the process for turning off power of the image forming unit 6, the sub-processor 11 sends a message to the main processor 2 that preparation is completed.

When the main processor 2 receives the message that the preparation is completed, the main processor 2 resets the sub-processor 11 to switch the switching control unit 13 for retrieving a power same mode control program from the power save mode control program storage unit 15. The power same mode control program stored in the power save mode control program storage unit 15 includes a process of performing a network process, a process of determining whether the print data are received and starting the main processor 2, and a process of not starting the main processor 2 and processing by itself according to an access from the network (for example, a print status request) not related to the printing operation.

In the embodiment, the sub-processor 11 performs the power save mode control program thus retrieved. More specifically, the sub-processor 11 sends an instruction to the power source control unit 8, so that power of an unnecessary circuit is terminated in the power save mode. That is, power of the main processor 2, the RAM 3, the ROM 4, the image processing unit 5, the image forming unit 6, and the inter-processor communication control unit 9 is terminated. In the power save mode, the sub-processor 11 performs various controls of the network through the network control unit 10. Further, in the power save mode, when the electric device 1 receives the print data, the sub-processor 11 instructs the power source control unit 8 to supply power to all components.

After the main processor 2 starts to become capable of processing the print data, the main processor 2 communicates with the sub-processor 11 through the inter-processor communication control unit 9 to take over the data processing of the network control unit 10. When the main processor 2 takes over the data processing, the main processor 2 copies the print data thus received and remaining in the network control unit 10 to the Ram 3. Further, the main processor 2 copies a parameter characteristic to the network (for example, an IP (Internet Protocol) address in the RAM 12, an MAC (Media Access Control) address, an RAM address for storing link information connecting the network and received data, and the likes) to the RAM 3 administered with the main processor 2, so that the main processor 2 can control the network control unit 10.

After the main processor 2 takes over all processes from the sub-processor 11, the main processor 2 resets the sub-processor 11. Further, the main processor 2 controls the switching control unit 13 to switch to the normal mode control program storage unit 14. A normal mode control program stored in the normal mode control program storage unit 14 includes a process of controlling motor drive of the electric device 1 as a page printer, a process of controlling the printing operation (on/off control of a high voltage, control of a fixing device, and the like), a process of monitoring a state of the page printer, a process of monitoring a remaining amount of a consumable good such as a toner remaining amount, and the like.

After the main processor 2 resets the sub-processor 11, the sub-processor 11 retrieves the normal mode control program, and performs a process of controlling the image forming unit 6 in the normal mode. More specifically, the sub-processor 11 controls the image forming unit 6, so that the image forming unit 6 receives the print data thus received from the image processing unit 5 to perform the printing operation, followed by discharging the recording sheet thus printed.

Figure 2:
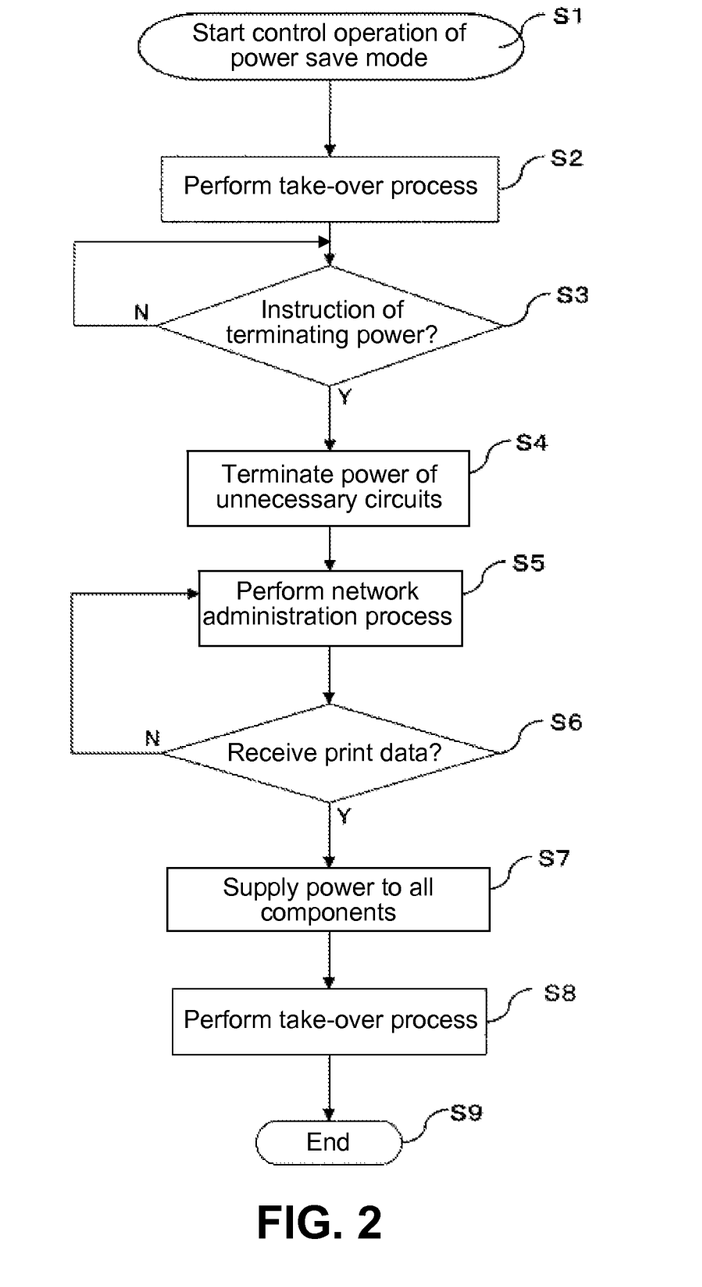
FIG. 2 is a flow chart showing a control operation of a sub-processor of the electric device in a power save mode according to the first embodiment of the present invention.

A control operation of the sub-processor 11 of the electric device 1 in the power save mode will be explained next. FIG. 2 is a flow chart showing the control operation of the sub-processor 11 of the electric device 1 in the power save mode according to the first embodiment of the present invention.

In step S1, the sub-processor 11 starts the control operation of the power save mode. In step S2, the sub-processor 11 performs the take-over process with the main processor 2 for taking over information such as various settings of the current communication (for example, the IP address in the RAM 12, the MAC address, the link information connecting to the network, the RAM address storing the received data, and the like).

In step S3, the sub-processor 11 determines whether the sub-processor 11 receives the instruction of terminating power (the power termination instruction) from the main processor 2. When the sub-processor 11 determines that the sub-processor 11 does not receive the power termination instruction from the main processor 2 (N), the process returns to step S2. When the sub-processor 11 determines that the sub-processor 11 receives the power termination instruction from the main processor 2 (Y), the process proceeds to step S4.

In step S4, the sub-processor 11 instructs the power source control unit 8 to terminate power of the unnecessary circuits. In step S5, the sub-processor 11 controls the network control unit 10 to perform the network administration process. In step S6, the sub-processor 11 determines whether the print data are received from the network. When the sub-processor 11 determines that the print data are not received from the network (N), the process returns to step S6 for continuously performing the network administration process. When the sub-processor 11 determines that the print data are received from the network (N), the process proceeds to step S7.

In step S7, the sub-processor 11 controls and instructs the power source control unit 8 to supply power to all components of the electric device 1. In step S8, the sub-processor 11 performs the take-over process with the main processor 2 for taking over the information of the current communication. The take-over process includes the print data received just before the take-over process. In step S9, the control process is completed.

Figure 3:
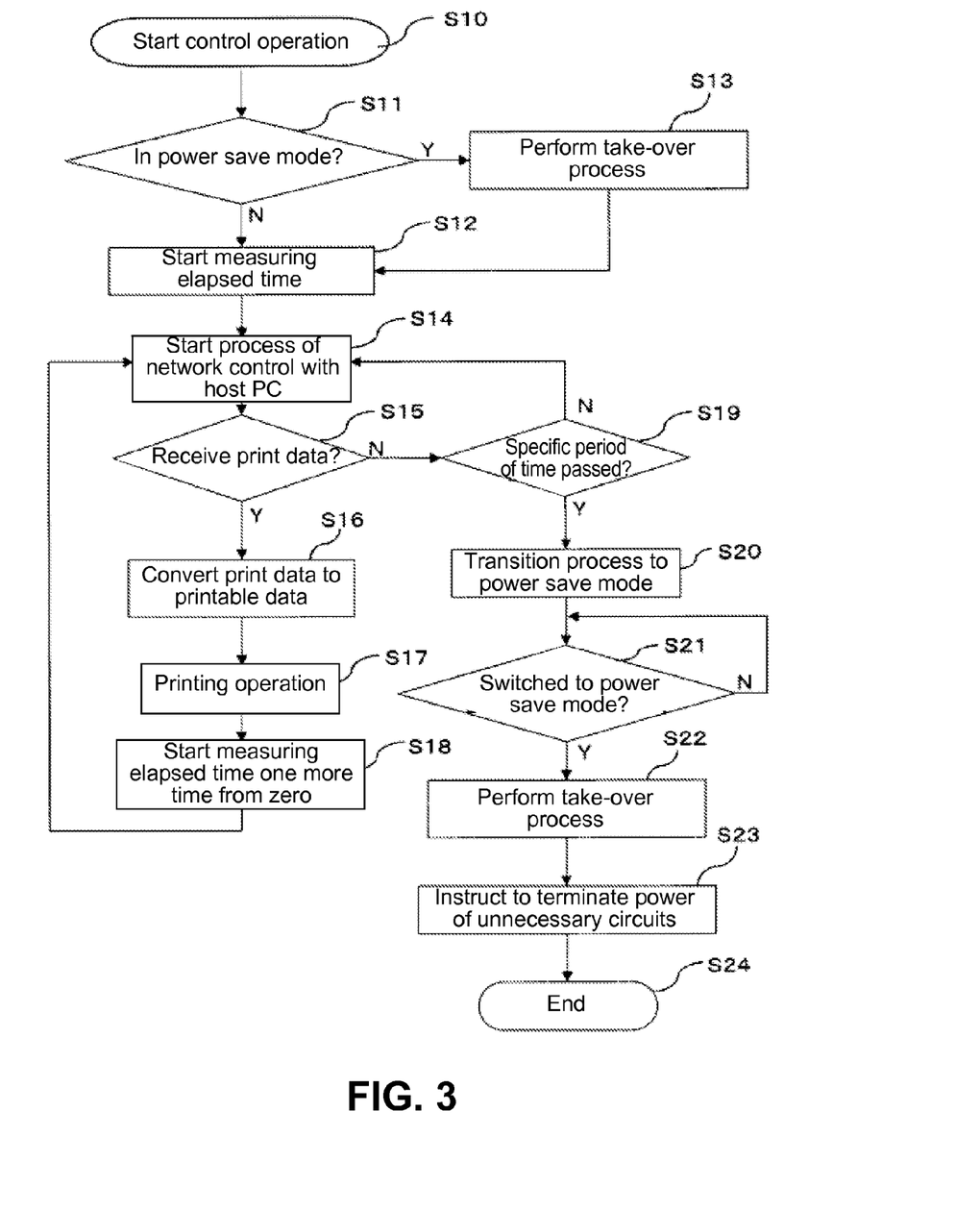
FIG. 3 is a flow chart showing a control operation of a main-processor of the electric device according to the first embodiment of the present invention.

A control operation of the main-processor 2 of the electric device 1 will be explained next. FIG. 3 is a flow chart showing the control operation of the main-processor 2 of the electric device 1 according to the first embodiment of the present invention.

In step S10, the main processor 2 starts the control operation. In step S11, the main processor 2 determines whether the sub-processor 11 is in the power save mode. When the main processor 2 determines that the sub-processor 11 is in the power save mode (Y), the process proceeds to step S13. When the main processor 2 determines that the sub-processor 11 is not in the power save mode (N), the process proceeds to step S12. In step S12, the main processor 2 starts measuring an elapsed time since the main processor 2 starts the control operation, and the process proceeds to step S14.

In step S13, the main processor 2 performs the take-over process with the sub-processor 11 for taking over the network control. In step S14, the main processor 2 controls the network control unit 10 to start the process of the network control with the host PC, and the process proceeds to step S15. In step S15, the main processor 2 determines whether the print data are received. When the main processor 2 determines that the print data are received (Y), the process proceeds to step S16. When the main processor 2 determines that the print data are not received (N), the process proceeds to step S19.

In step S16, the main processor 2 sends the print data thus received to the image processing unit 5 to convert the print data to the printable data. In step S17, the image forming unit 6 performs the printing operation, and the process proceeds to step S18. In step S18, the main processor 2 starts measuring the elapsed time one more time from zero, and the process returns to step S14.

In step S19, the main processor 2 determines whether a specific period of time is elapsed. When the main processor 2 determines that the specific period of time is elapsed (Y), the process proceeds to step S20. When the main processor 2 determines that the specific period of time is not elapsed (N), the process returns to step S14.

In step S20, the main processor 2 performs the transition process to the power save mode. More specifically, the main processor 2 instructs the sub-processor 11 to terminate the control process of the image forming unit 6. When the sub-processor 11 notifies the completion of the termination, the main processor 2 switches the switching control unit 13 from retrieving from the normal mode control program storage unit 14 to retrieving from the power save mode control program storage unit 15. Then, the main processor 2 sets a reset signal of the sub-processor 11 to zero, and sets the reset signal to one after a specific period of time.

In step S21, the main processor 2 determines whether the prosecuting program of the sub-processor 11 is switched to the power save mode. When the main processor 2 determines that the prosecuting program of the sub-processor 11 is switched to the power save mode (Y), the process proceeds to step S22. When the main processor 2 determines that the prosecuting program of the sub-processor 11 is not switched to the power save mode (N), the main processor 2 waits for the switching.

In step S22, the main processor 2 sends the various information of the network control controlled in the main processor 2 to the sub-processor 11, so that the network control is taken over, and the process proceeds to step S23. In step S23, after the main processor 2 completes the transition process to the power save mode, the main processor 2 instructs the sub-processor 11 to terminate power of the unnecessary circuits. In step S24, the control operation is completed.

Figure 4:
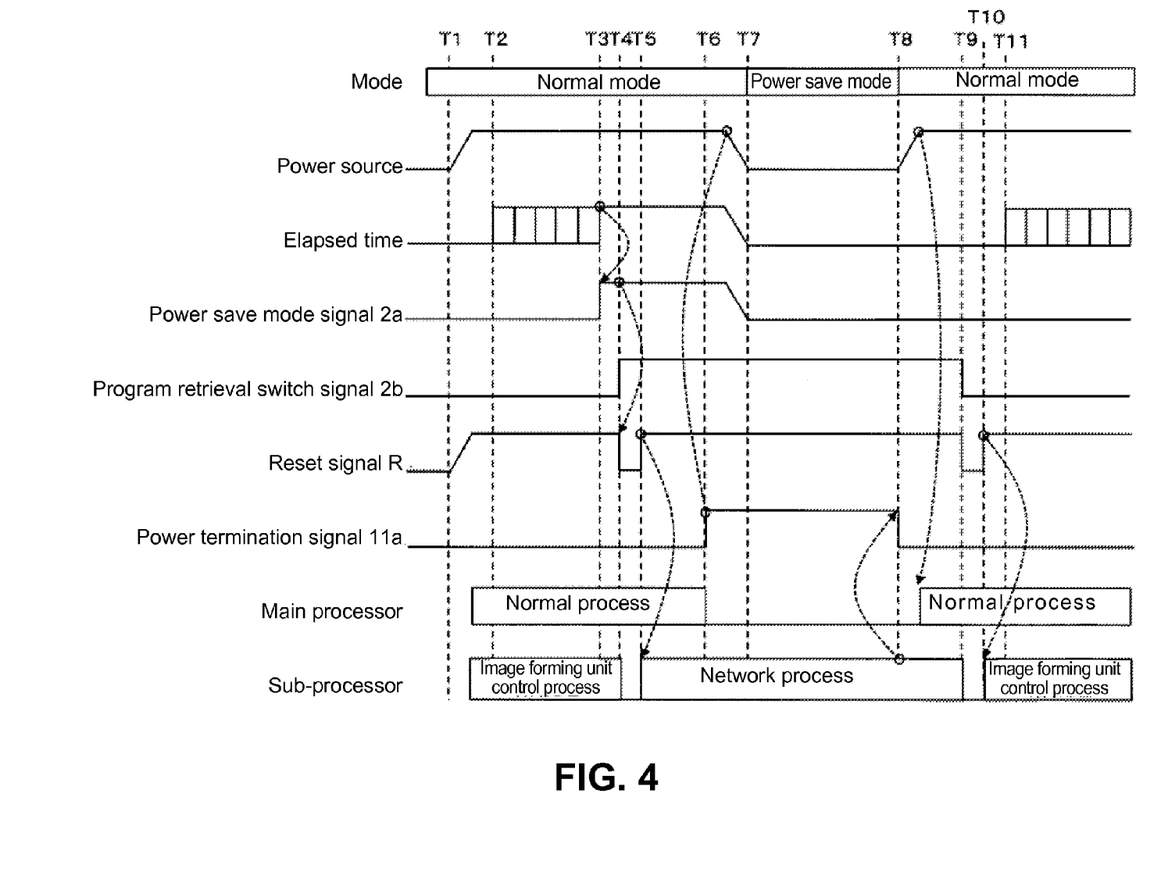
FIG. 4 is a time chart showing a control operation of the electric device according to the first embodiment of the present invention.

A control operation of the electric device 1 will be explained next. FIG. 4 is a time chart showing the control operation of the electric device 1 according to the first embodiment of the present invention.

In the time chart, a sequence of the operation is represented according to changes in signals. The sequence covers from when the electric device 1 is turned on to when the electric device 1 starts in the normal mode, the electric device 1 is switched to the power save mode, and the electric device 1 is returned to the normal mode.

At timing T1, when the electric device 1 is turned on, the switching control unit 13 selects the normal mode control program storage unit 14. Further, the main processor 2 performs the normal process and the sub-processor 11 performs the image forming unit control process. At timing T2, the main processor 2 starts measuring the elapsed time for switching to the power save mode. At timing T3, when the elapsed time reaches the specific period of time, the main processor 2 determines to switch to the power save mode. Accordingly, the main processor 2 sets a power save mode signal 2a to one, so that the main processor 2 starts the transition process to the power save mode. At this moment, the sub-processor 11 starts the termination process of the image forming unit 6.

At timing T4, when the sub-processor 11 notifies the main processor 2 that the transition process to the power save mode is completed, the main processor 2 sets a reset signal R of the sub-processor 11 to zero. At the same time, the main processor 2 switches the program to be retrieved with the sub-processor 11. At timing T5, the main processor 2 sets the reset signal R of the sub-processor 11 to one. At this moment, the sub-processor 11 retrieves the program for the power save mode, and starts the network process. Further, the main processor 2 transmits the information for the network control to the sub-processor 11.

At timing T6, the main processor 2 determines that the sub-processor 11 completes the preparation of the network control process. Accordingly, the main processor 2 instructs the sub-processor 11 to terminate power to the unnecessary circuits. As a result, the sub-processor 11 sets a power termination signal 11a to one.

At timing T7, power to the unnecessary circuits including the main processor 2 is terminated, and the sub-processor 11 starts the network process. At this moment, the main processor 2 is completely turned off, and the sub-processor 11 performs the network control in the power save mode.

At timing T8, the sub-processor 11 determines that the data to be printed are received, and turns on the entire portion of the electric device 1. At this moment, the main processor 2 starts the normal process. Further, the main processor 2 detects the state of the sub-processor 11, and determines that the main processor 2 is returned from the power save mode. Accordingly, the main processor 2 exchanges the information for the network control with the sub-processor 11, and the main processor 2 performs the control process of the network.

At timing T9, the main processor 2 determines that the sub-processor 11 is capable of performing the image forming unit control process, and sets the reset signal R of the sub-processor 11 to zero. At the same time, the main processor 2 switches a program retrieval switch signal 2b to the retrieval of the normal mode control program.

At timing T10, the main processor 2 sets the reset signal R of the sub-processor 11 to one. Accordingly, the sub-processor 11 retrieves the normal mode control program, and starts the image forming unit control process. When the image forming unit 6 is capable of performing the printing operation, the main processor 2 starts the printing operation of the data thus received. At timing T11, the main processor 2 starts measuring the elapsed time for the transition to the power save mode once again.

As described above, in the first embodiment, the sub-processor 11 performs the control process of the image forming unit 6 in the normal mode. In the power save mode, the sub-processor 11 with low power consumption performs the network control process. Further, in the power save mode, the main processor 2 with large power consumption and the unnecessary circuits are turned off. Accordingly, it is possible to reduce power consumption of the electric device 1 during the idle time. Further, the sub-processor 11 performs the network control process, so that operability of the electric device 1 is improved.

Second Embodiment

Figure 5:
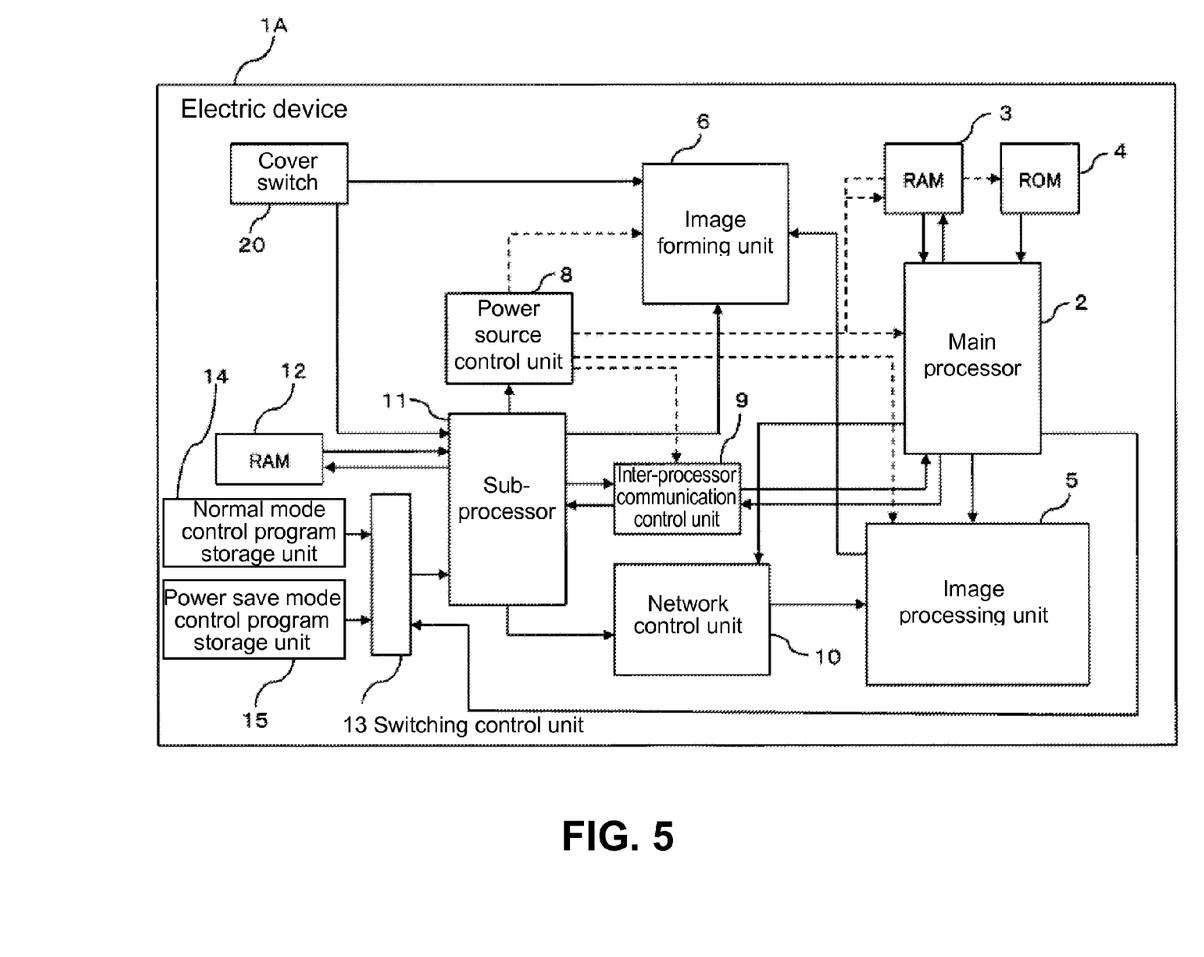
FIG. 5 is a schematic view showing a block diagram showing a configuration of an electric device according to a second embodiment of the present invention.

A second embodiment of the present invention will be explained next. FIG. 5 is a schematic view showing a block diagram showing a configuration of an electric device 1A according to the second embodiment of the present invention. Components in the second embodiment similar to those in the first embodiment are designated with the same reference numerals.

As shown in FIG. 5, the electric device 1A includes a cover switch 20 for detecting whether a cover of the image forming unit 6 opens. In the electric device 1A, the sub-processor 11 monitors the cover switch 20 of the image forming unit 6 in the power save mode. When the cover of the image forming unit 6 does not open, it is possible to skip an initialization process of the image forming unit 6, which is usually conducted, when the electric device 1A is switched from the power save mode to the normal mode, thereby reducing a period of time for returning to the normal mode.

More specifically, when the cover of the image forming unit 6 is opened, the cover switch 20 is turned on. The image forming unit 6 includes various image developing units. When developing toner does not have a sufficient amount, it is necessary to replace corresponding one of the image developing units. When the cover of the image forming unit 6 is opened to replace one of the image developing units, it is necessary to perform correction of color shift and various initialization processes.

In the second embodiment, the cover switch 20 is turned on even in the power save mode, so that the sub-processor 11 monitors a state of the cover switch 20. Accordingly, in the power save mode, when power of the image forming unit 6 is terminated, it is possible to store a history of opening and closing of the cover. As a result, it is possible to transmit the history to the main processor 2 upon returning to the normal mode. Other configurations of the electric device 1A are similar to those of the electric device 1 in the first embodiment.

Figure 6:
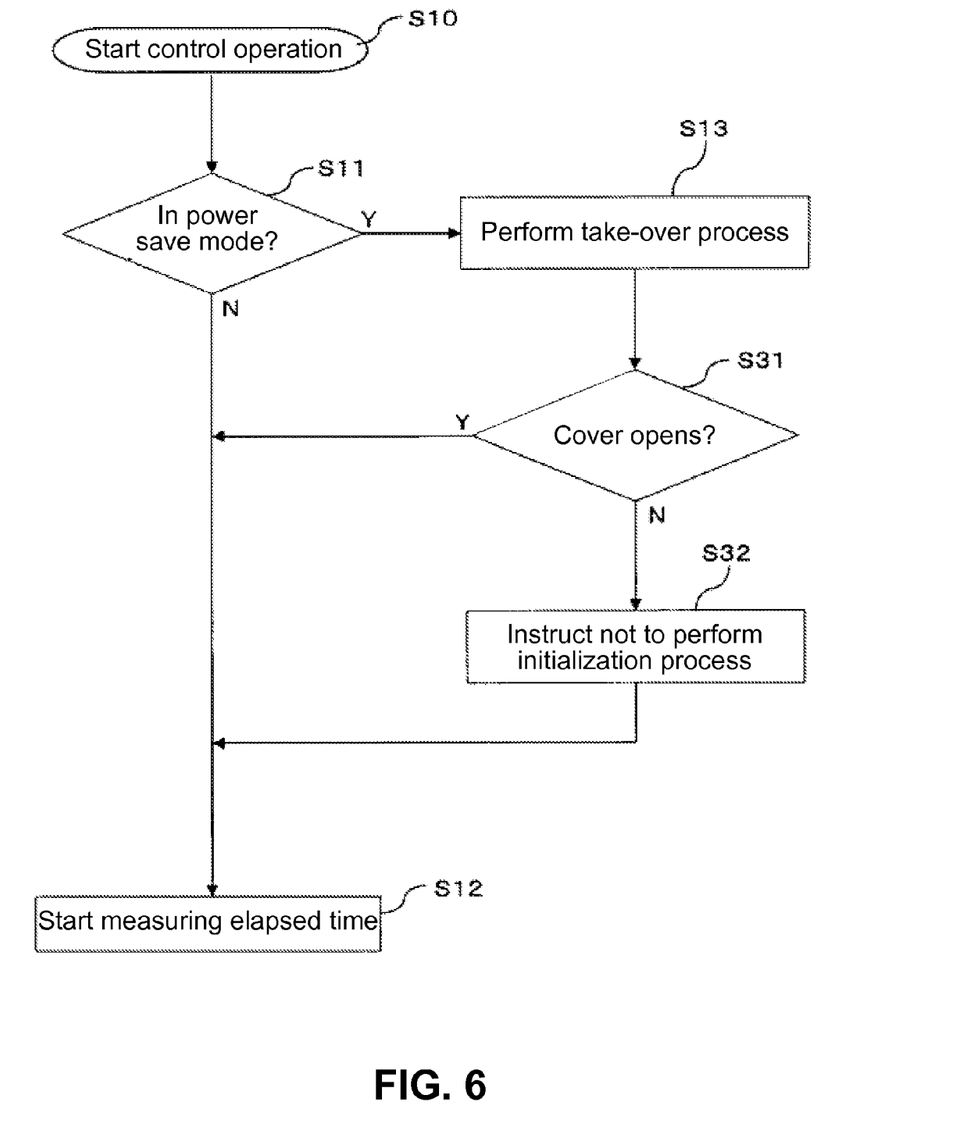
FIG. 6 is a flow chart showing a control operation of a main-processor of the electric device according to the second embodiment of the present invention.

A control operation of the main-processor 2 of the electric device 1A will be explained next. FIG. 6 is a flow chart showing the control operation of the main-processor 2 of the electric device 1A according to the second embodiment of the present invention. Steps in the second embodiment similar to those in the first embodiment are designated with the same reference numerals.

In the flow chart shown in FIG. 6, steps S31 and S32 are inserted between step S13 to step S12 of the flow chart shown in FIG. 3. Only difference of the control operation of the main processor 2 from the first embodiment will be explained.

After the main processor 2 exchanges the network control with the sub-processor 11 in step S13, the process proceeds to step S31. In step S31, the main processor 2 retrieves the history information of the cover switch 20 of the image forming unit 6 from the sub-processor 11, so that the main processor 2 determines whether the cover is opened. When the main processor 2 determines that the cover is opened (Y), the process proceeds to step S12. When the main processor 2 determines that the cover is not opened (N), the process proceeds to step S32. In step S32, the main processor 2 instructs the sub-processor 11 not to perform the initialization process of the image forming unit 6, and the process proceeds to step S12. The process after step S12 is the same as that in the first embodiment.

As described above, in the second embodiment, the sub-processor 11 monitors the cover switch 20 of the image forming unit 6 in the power save mode. According to the opening history of the cover, the initialization process of the image forming unit 6 is not conducted, when the electric device 1A is switched from the power save mode to the normal mode, thereby reducing a period of time for returning to the normal mode. Further, it is possible to form a proper image all the time, thereby improving operability of the electric device 1A.

The present invention is not limited to the first and second embodiments, and may be modified as follows.

The configurations of the electric device 1 and the electric device 1A shown in FIGS. 1 and 5 may be modified. Further, the control operations shown in FIGS. 2 to 4 and 6 may be modified.

In the first and second embodiments, the electric device 1 and the electric device 1A are explained as the image forming apparatus. The present invention is applicable to other image forming apparatus such as a facsimile, a copier, a multi-function product, and the like. In this case, it is possible to obtain an effect similar to those in the first and second embodiments.

The disclosure of Japanese Patent Application No. 2009-147480, filed on Jun. 22, 2009, is incorporated in the application by reference.

While the invention has been explained with reference to the specific embodiments of the invention, the explanation is illustrative and the invention is limited only by the appended claims.

What is claimed is:

1. An electric device capable of operating in a normal operation mode and a power save operation mode, comprising:
 a first processor for processing information input externally in the normal operation mode; and
 a second processor for processing an internal operation of the electric device in the normal operation mode, said second processor having power consumption smaller than that of the first processor, said second processor restricting the internal operation and processing the information input externally in the power save operation mode;
 wherein said first processor is configured to switch an operation of the second processor from an operation in the normal operation mode to an operation in the power save operation mode when the first processor detects a transition factor to the power save operation mode,
 power of the first processor is restricted through a restriction process in the power save operation mode,
 said power of the first processor is released through a restriction releasing process when the second processor detects the information input externally, and
 said restriction process is performed to terminate the power of the first processor.

2. The electric device according to claim 1, wherein said first processor is configured to switch a program of the second processor from a program in the normal operation mode to a program in the power save operation mode when the first processor detects the transition factor to the power save operation mode.

3. The electric device according to claim 1, wherein said first processor is configured to switch the operation of the second processor from the operation, in the normal operation mode to the operation in the power save operation mode when the first processor does not receive data within a predetermined period of time.

4. The electric device according to claim 1, wherein said restriction releasing process is performed to supply the power to the first processor.

\* \* \* \* \*